Sheet 1 - 2 Sheets.
L. Lefebvre.
Evaporating Pan,
No. 931, Reissued Mar. 20, 1860.
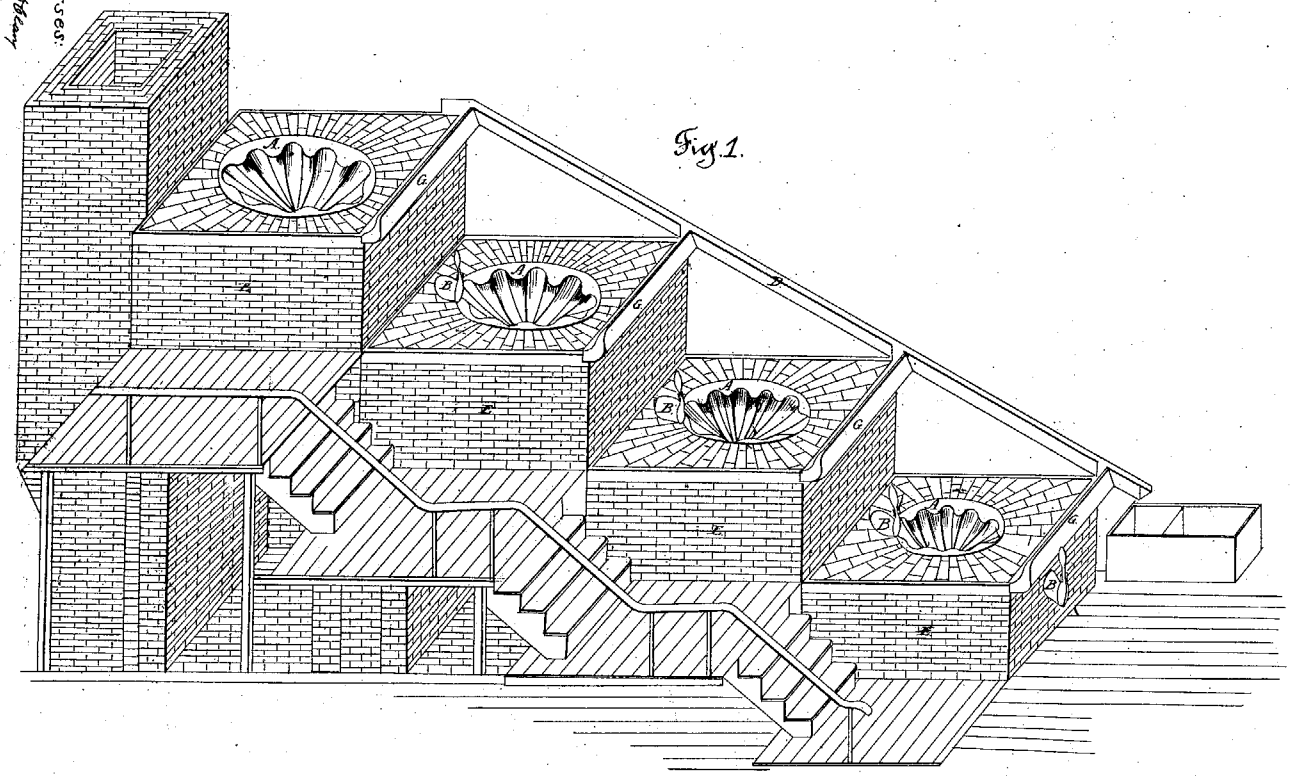
Witnesses:
James O'Leary
L. McLutterland
Inventor:
L. Lefebvre
per E. Walter
Atty.
N. PETERS, PHOTO-LITHOGRAPHER, WASHINGTON, D. C.

Sheet 2 - 2 Sheets.
L. Lefebvre
Evaporating Pan,
No. 931, Reissued Mar. 20, 1860.
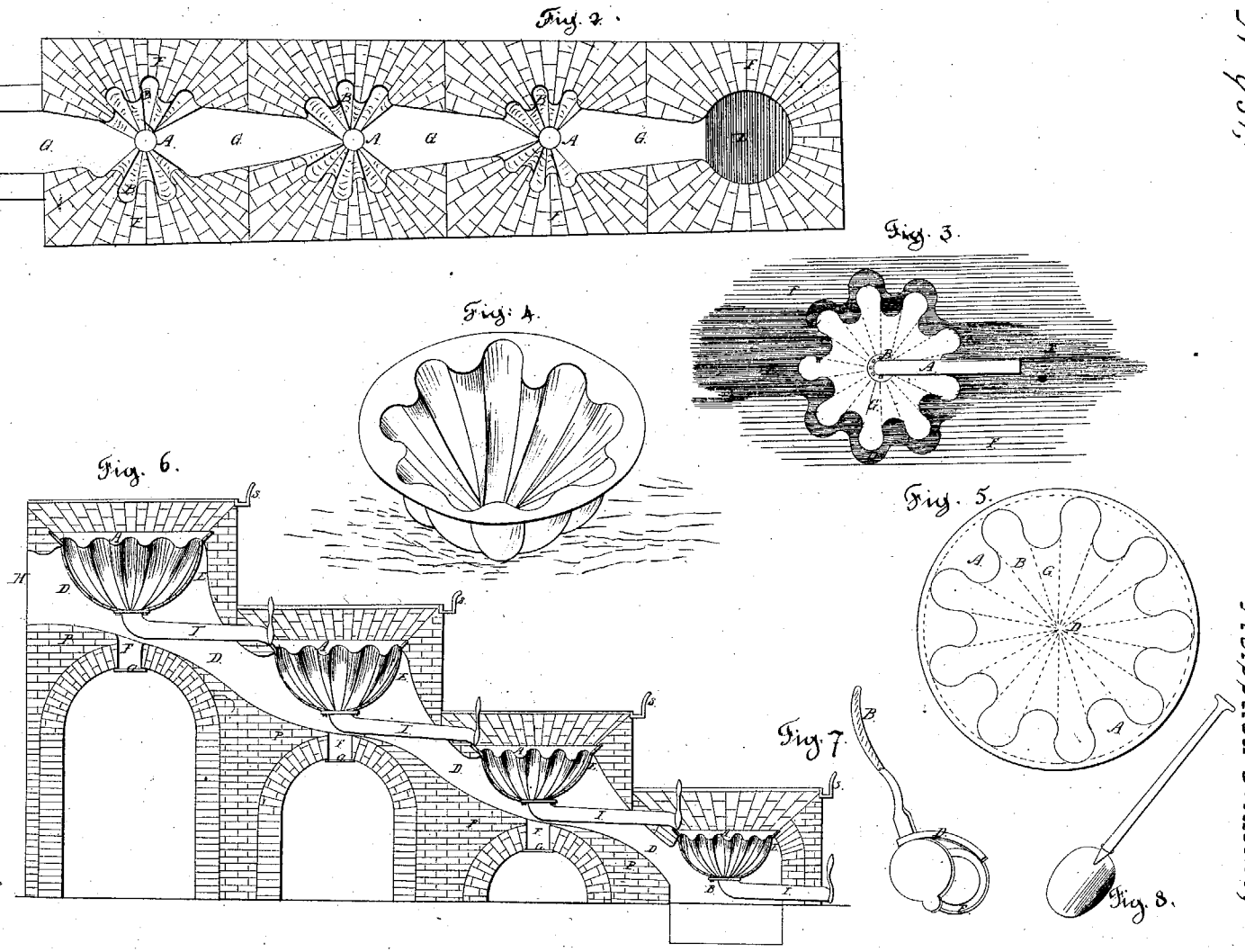
Witnesses: James B. Clary, L. M. Lauhenheimer
Inventor: L. Lefebvre, per E. Patten, atty.
N. PETERS, PHOTO-LITHOGRAPHER, WASHINGTON, D. C.

UNITED STATES PATENT OFFICE.

LOUIS LEFEBVRE, OF NEW ORLEANS, LOUISIANA.

IMPROVEMENT IN FURNACES FOR EVAPORATING SUGAR-JUICES.

Specification forming part of Letters Patent No. 22,126, dated November 23, 1858; Additional Improvement No. 263, dated January 24, 1860; Reissue No. 931, dated March 20, 1860.

*To all whom it may concern:*

Be it known that I, LOUIS LEFEBVRE, of New Orleans, parish of Orleans, State of Louisiana, have invented a new Improvement in Apparatus for Evaporating Cane-Juice; and I do hereby declare that the following is a full, clear, and exact description thereof, reference being had to the accompanying drawings, and to the letters of reference marked thereon.

The object of my invention is to effect an economy of time and fuel by a speedy evaporation—the result of the multiplication of the surfaces exposed to the fire and of the concentration of heat.

My invention consists—

First. Of hemispherical kettles with alternate flutes, presenting a double extent of surface to the fire. These kettles possess, moreover, the advantage of economizing the consumption of fuel and of offering a stronger resistance to the action of heat than do the ordinary kettles, in consequence of the great expansion of their flutes or alternate arched surfaces.

Second. Of a fluted or corrugated brick-work, so adjusted as to correspond to the indented surfaces of the kettles, and thus compel the fire to follow the undulations of the flue and the kettle. This brick-work is a great economizer of fuel, as it accelerates evaporation by the reverberation and concentration of heat.

Third. Of a connecting-pipe eight or ten inches in diameter, the lower extremity closed by means of a valve, so that it may be kept full of liquid and may be exposed to the action of the fire without danger of burning. While this connection-pipe obviates the inconvenience of the tub used for passing the sirup from one kettle to another, it saves the consumption of fuel by presenting to the fire an additional amount of surface.

Fourth. Of a gutter placed on the right of each kettle to recover the scum, and sufficiently inclined to empty it into the large common gutter which leads to a double-section vat, to be there clarified. By means of this gutter the scum which contains foreign substances injurious to the manufacture of sugar, instead of being thrown from kettle to kettle until it reaches the last, is immediately and directly withdrawn.

Fifth. In a peculiar construction, for the purpose of adapting the setting to the burning of coal, consisting in inclosing the kettles within cylindrical flues communicating with the undulating flue around the kettle at the top thereof by graduated draft-channels, as will be hereinafter set forth, so as uniformly to distribute the heat over the entire surface of the kettle.

The details will be understood by reference to the drawings.

Sheet A: Figure 1 is a perspective view, in which A represents the kettle. B represents the emptying-valves. C represents gutters to receive the scum and convey it to the larger one, D, which leads to a double-section vat, there to be clarified. E represents plain common brick-work.

Fig. 2 is a brick-work plan. A represents deposit of ashes. B represents corrugated part of the flue corresponding with the wrinkles of the kettle. C represents the flue of the chimney. D represents the chimney. E represents grate of the furnace. F represents the common plain brick-work.

Fig. 3 is a section of the kettles, seen underneath. A is the emptying or connecting pipe, attached to the kettle, and passing through the flue. B is part of the emptying-pipe, fixed to the bottom of the kettle by screws C. D is the corrugated or fluted flue under the kettle. E is the common flue. F is the common brick-work. G is the kettle.

Fig. 4 is a perspective view of the kettle, made of cast metal, with an undulated or fluted surface, the width of the flutes gradually decreasing from top to bottom, where the vertices of all the flutes meet, thus constituting a fluted hemisphere. The flutes may be made as deep as desired, giving a greater amount of surface as the flutes are deepened. These flutes, moreover, add to the strength of the kettle in addition to the increased surface given.

Fig. 5 is a plan of the kettle. A represents rims of the kettle. B represents concave flutes. C represents convex flutes. D represents points of junction of the flutes.

Fig. 6 is a section of Fig. 1. A represents the kettle. B represents the furnace. C represents the ash-pan in the ground. D represents flue or chimney. E represents the flue's vault. F represents deposit of ashes. G represents doors giving access to spaces F, in order to clean them. H represents chimney. I represents connecting or emptying pipes. P represents plain common brick-work. S represents the gutters.

Fig. 7 is a view of the emptying-valves. A represents the shutter. B represents wooden handle of the shutter. C represents the spout. D represents the slide of the shutter. E represents part of the valves fixed to the emptying-pipe *o*.

Fig. 8 shows the form of an instrument to be used in cleaning the flutes of the kettle.

Sheet B: Fig. 1 is a perspective view, in which A represents the kettle. B represents the tiling. C represents the arched vault which supports part of the circular flue and enables the fireman to approach the furnaces. D represents the common chimney.

Fig. 2 is a plan view of the set of kettles. A represents view of the brick-work prepared to receive the kettles. B represents circular flue drawing the smoke around the upper part of the kettle by means of graduated draft-holes. C represents fluted portion of brick-work. D represents graduated draft-holes. E represents the grates. F represents arched chimney conducting the smoke to the common chimney. G represents view of a kettle without the edge. H represents undulating space between the brick and the kettle. I represents a view of a kettle without its edge, exhibiting the pin-up of the kettle. K represents tin pin, up which supports the kettle. L represents kettle in position.

Fig. 3 is a longitudinal section. A represents the kettles. B represents interior of the furnace. C represents the grates. D represents the ash-pan. E represents the circular flue. F represents graduated draft-holes corresponding to the upper part of the kettles or cylindrical flue.

Fig. 4 is a transverse section. A represents arched chimney. B represents space between chimney and wall to enable the fireman to pass from one fire to another.

Fig. 5 is a perspective view of the alternate fluted kettle.

Fig. 6 is a plan of the kettle.

The operation of this construction for burning coal is as follows: The channels issuing from the top of the undulating flue cause the heated currents to be drawn to the top of the kettle, and the graduation, by making the channels largest on the side opposite the main chimney, and making their issues alternately at the concave and convex portion of the undulating flue, uniformly diffuses the heat over the whole of the surface of the kettle.

I am aware that corrugated surfaces have been employed in apparatus for evaporating cane-juice. I therefore disclaim the use of corrugations for such purpose, broadly considered; but What I do claim as new and of my own invention, and desire to secure by Letters Patent, is—

1. The hemispherical kettle with alternate converging flutes, as and for the purpose described.

2. In combination with the said kettle, fluting the surrounding brick-work, as described, so as to fom an undulating flue around the kettle.

3. Passing the connecting-pipes of the kettles through the flues, whereby they are utilized as evaporators, as set forth.

4. The inclined gutter, in combination with the gutters of the respective kettles, as described.

5. The cylindrical flue inclosing the kettle, connected with the exit-flue, and communicating with the undulating flue at top by graduated draft-channels, substantially as set forth.

In testimony whereof I have hereunto signed my name before two subscribing witnesses.

L. LEFEBVRE.

Witnesses:
GEO. PATTEN,
JOHN S. HOLLINGSHEAD.